(12) United States Patent
Osotio et al.

(10) Patent No.: US 10,068,256 B2
(45) Date of Patent: Sep. 4, 2018

(54) USER DIRECTED INFORMATION COLLECTIONS

(71) Applicant: Microsoft Technology Licensing, LLC, Redmond, WA (US)

(72) Inventors: Neal Osotio, Seattle, WA (US); Angela Moulden, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 595 days.

(21) Appl. No.: 14/509,943

(22) Filed: Oct. 8, 2014

(65) Prior Publication Data

US 2016/0104200 A1 Apr. 14, 2016

(51) Int. Cl.
*G06Q 30/02* (2012.01)

(52) U.S. Cl.
CPC ..... *G06Q 30/0267* (2013.01); *G06Q 30/0269* (2013.01); *G06Q 30/0201* (2013.01); *G06Q 30/0241* (2013.01); *G06Q 30/0251* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 6,925,603 B1 | 8/2005 | Naito et al. | |
| 7,356,332 B2 | 4/2008 | Pell et al. | |
| 7,565,175 B2 | 7/2009 | Pell et al. | |
| 8,364,708 B1 | 1/2013 | Braytenbaum et al. | |
| 8,660,849 B2 | 2/2014 | Gruber et al. | |
| 8,719,026 B2 | 5/2014 | Kennewick et al. | |
| 8,831,879 B2 | 9/2014 | Stamm et al. | |
| 2003/0218535 A1* | 11/2003 | Khoshbin | G06Q 20/04 340/7.53 |
| 2006/0200671 A1* | 9/2006 | Ishigaki | G06Q 30/02 713/176 |
| 2006/0218029 A1 | 9/2006 | Chin | |

(Continued)

FOREIGN PATENT DOCUMENTS

| | | |
|---|---|---|
| WO | 2011059840 A2 | 5/2011 |
| WO | 2014047047 A1 | 3/2014 |

OTHER PUBLICATIONS

"International Search Report and Written Opinion Issued in PCT Application No. PCT/US2015/022885", dated Jul. 3, 2015, 10 pages.

(Continued)

*Primary Examiner* — Vincent M Cao

(57) ABSTRACT

Systems and methods for creating and/or displaying a user information collection are described herein. The user information collections include relevant information for a user of one or more devices. More specifically, the relevant information in the user information collections can include user directed advertisements. User information collections improve a user's ability to accomplish tasks, save money, and/or get desired products and/or services as opposed to just viewing content. Additionally, the user information collections reduce or prevent unwanted data from being added to the user information collections improving the usability of the data in the user information collections and improving user interactions with the device.

20 Claims, 11 Drawing Sheets

(56) References Cited

U.S. PATENT DOCUMENTS

| | | | |
|---|---|---|---|
| 2006/0218479 A1* | 9/2006 | Torres | G06F 17/30873 715/234 |
| 2007/0171192 A1 | 7/2007 | Seo et al. | |
| 2007/0276729 A1* | 11/2007 | Freer | G06Q 30/02 705/14.44 |
| 2007/0276942 A1 | 11/2007 | Wadhwa | |
| 2008/0065490 A1* | 3/2008 | Novick | G06Q 30/02 705/14.26 |
| 2009/0124241 A1* | 5/2009 | Krishnaswamy | G06Q 30/02 455/414.2 |
| 2009/0132365 A1* | 5/2009 | Gruenhagen | G06F 17/30699 705/14.69 |
| 2009/0222346 A1* | 9/2009 | Greene | G06Q 10/04 705/14.53 |
| 2010/0076775 A1* | 3/2010 | Tesler | G06Q 30/02 705/319 |
| 2010/0086107 A1 | 4/2010 | Tzruya | |
| 2012/0253920 A1 | 10/2012 | Yarvis et al. | |
| 2013/0036117 A1 | 2/2013 | Fisher et al. | |
| 2013/0159377 A1 | 6/2013 | Nash | |
| 2013/0262225 A1 | 10/2013 | Ahrens et al. | |
| 2013/0325332 A1 | 12/2013 | Rhee | |
| 2014/0136333 A1 | 5/2014 | Shoshitaishvili et al. | |
| 2014/0143004 A1 | 5/2014 | Abhyanker | |
| 2014/0200426 A1 | 7/2014 | Taub | |
| 2014/0282200 A1 | 9/2014 | Tam | |
| 2014/0379481 A1 | 12/2014 | Gupta | |
| 2015/0046440 A1 | 2/2015 | Shoham | |
| 2015/0073959 A1 | 3/2015 | Connors | |
| 2015/0278765 A1 | 10/2015 | Dantuluri et al. | |

OTHER PUBLICATIONS

Lamber, et al., "MobiDay: A Personalized Context-Aware Mobile Service for Day Hospital Workflow Support", In Proceedings International Workshop on Personalization for E-Health, 2009, vol. 19, 5 pages.

Wang, et al., "Application of Context-Aware and Personalized Recommendation to Implement an Adaptive Ubiquitous Learning System", In Proceedings of Expert Systems with Applications, 2011, vol. 38, No. 9, pp. 10831-10838.

U.S. Appl. No. 14/532,742, Office Action dated Nov. 22, 2016, 8 pgs.

PCT International Preliminary Report on Patentability in Application PCT/US2015/022885, dated Oct. 4, 2016, 7 pgs.

Kim, Ryan, "Proactive Assistant App Easilydo Rolls up Tasks, Raises $4.3M", Published on: Dec. 13, 2012, Available at: http://gigaom.com/2012/12/13/proactive-assistant-app-easilydo-rolls-up-tasks-raises-4-3m/, 5 pgs.

Kim, Ryan, "Grokr brings Google Now mobile search smarts to iOS" Retrieved on: Dec. 11, 2012, Available at: http://gigaom.com/2012/12/11/grokr-brings-google-now-mobile-search-smarts-to-ios/, 6 pgs.

Lawler, Ryan, "Mobile Personal Assistant App Donna Can Now Email Contacts to Tell Them You're Running Late", Published on: Nov. 21, 2013, Available at: http://techcrunch.com/2013/11/21/donna-2-0/, 7 pgs.

Wu, et al., "User Model of a Personal Assistant in Collaborative Design Environments", In Proceedings Agents in Design, Mar. 12, 2014, pp. 39-54.

Byun, et al., "Supporting Proactive 'Intelligent' Behaviour: the Problem of Uncertainty", In Proceedings of Workshop on User Modelling for Ubiquitous Computing, User Modeling, Jun. 22, 2003, 9 pages.

Renard, Gregory, "The Proactive Web Era: Intelligent Web and Intelligent Services are knocking at the door !", Published on: Oct. 14, 2011, Available at: http://gregoryrenard.wordpress.com/2011/10/14/the-proactive-web-era-intelligent-web-and-intelligent-services-are-knocking-at-the-door/, 13 pgs.

Warren, Tom, "This is Cortana, Microsoft's answer to Siri", Published on: Mar. 3, 2014, Available at: http://www.theverge.com/2014/3/3/5465264/microsoft-cortana-windows-phone-screenshots, 4 pgs.

McGill, Shaun, "How Siri turns my iPhone 4S into the Ultimate PDA and Makes Every Other Smartphone Look Dumb", Published on: Oct. 25, 2011, Available at: Http://Www.Lostinmobile.Com/Home/How-Siri-Turns-My-Iphone-4s-Into-The-Ultimate-Pda-And-Makes.Html, 18 pgs.

Vallet, et al., "Personalized Content Retrieval in Context Using Ontological Knowledge", In IEEE Transactions on Circuits and Systems for Video Technology, 2006, 9 pages.

Nerney, Chris, "How to turn Google now into a Powerful Personal Assistant", Published on: Nov. 12, 2013, Available at: http://www.citeworld.com/mobile/22675/google-now-getting-started, 5 pgs.

"Cross Device Platform", Retrieved on: Jul. 21, 2014, Available at: http://s6.io/solutions/cross-device/, 3 pgs.

"Audience Deduplication Platform", Retrieved on: Jul. 21, 2014, Avialable at: http://s6.io/solutions/audience-deduplication-platform/, 3 pgs.

"IntentIQ—Intent TV", Published on: Jul. 14, 2012, Available at: http://www.intentiq.com/?page_id=18, 2 pgs.

Hull, Jeremy, "Google Launches Estimated Cross-Device Update", Published on: Oct. 2013, Available at: http://www.iprospect.com/google-launches-estimated-cross-device-update, 6 pgs.

"Cross-Device Advertising Solutions", Published on: Mar. 30, 2014, Available at: http://www.tactads.com/en/, 2 pgs.

Ward, Chris, "Intent targeting: A Creepy or Revolutionary Next Step for Advertising?", Published on: May 13, 2014, Available at: http://www.mycustomer.com/feature/technology/intent-targeting-creepy-or-revolutionary-next-step-advertising/167001, 11 pgs.

Tan, Kevin, "Cross-Device Targeting—Why the Hype?", Published on: Feb. 27, 2014, Available at: http://www.clickz.com/clickz/column/2330970/cross-device-targeting-why-the-hype, 16 pgs.

U.S. Appl. No. 14/532,742, Amendment and Response filed Jul. 20, 2017, 9 pgs.

U.S. Appl. No. 14/532,742, Office Action dated Aug. 25, 2017, 14 pgs.

U.S. Appl. No. 14/532,742, Amendment and Response filed Feb. 22, 2017, 8 pgs.

U.S. Appl. No. 14/532,742, Office Action dated Apr. 20, 2017, 11 pgs.

U.S. Appl. No. 14/532,742, Amendment and Response filed Nov. 27, 2017, 10 pgs.

U.S. Appl. No. 14/532,742, Office Action dated Dec. 19, 2017, 14 pgs.

U.S. Appl. No. 14/532,742, Office Action dated May 22, 2018, 12 pages.

* cited by examiner

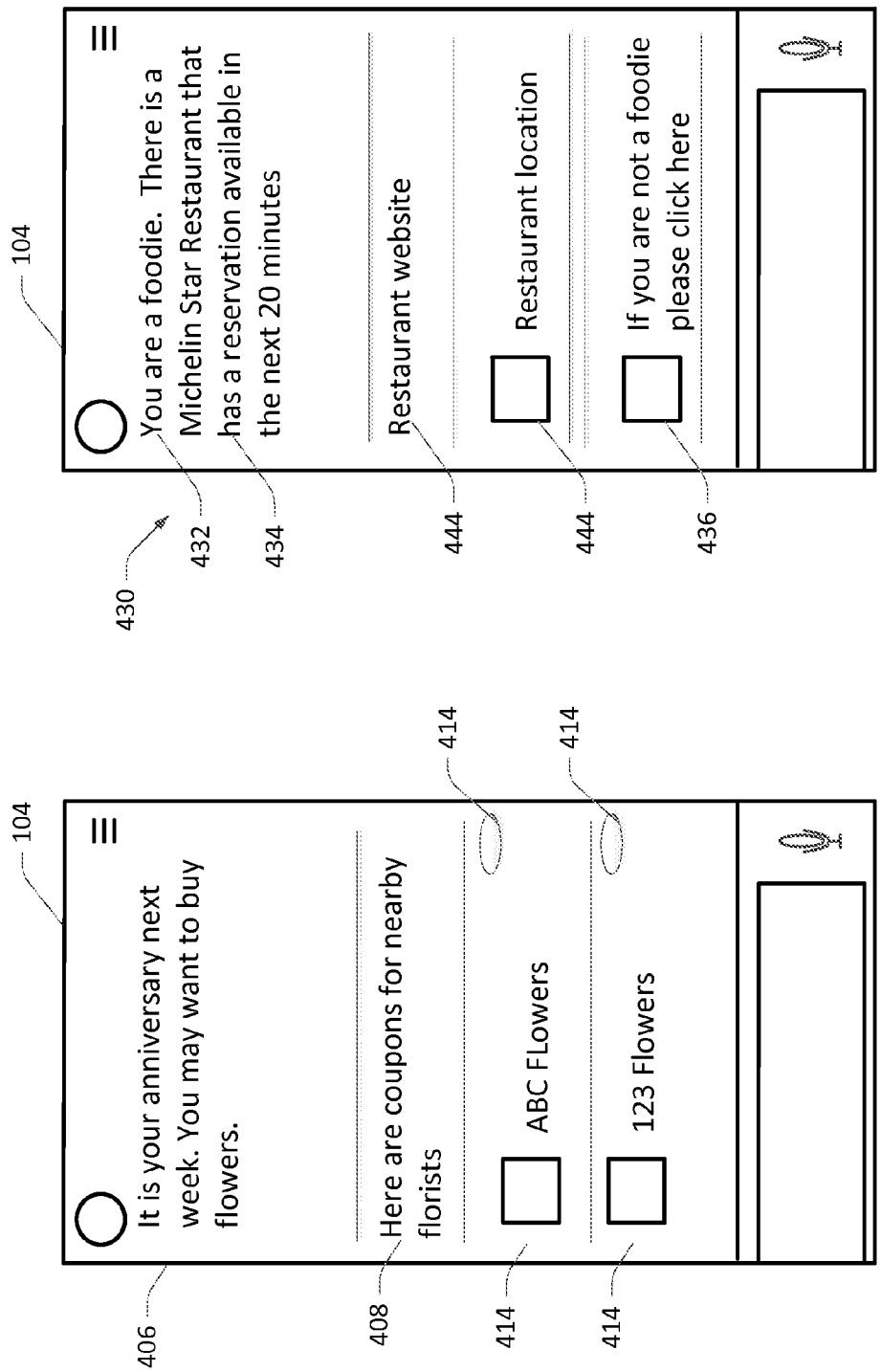

USER DIRECTED INFORMATION COLLECTIONS

BACKGROUND

Multiple sources of information are often accessed for accomplishing day to day tasks. For example, in planning and conducting personal and work activities, a mobile device user may consult multiple calendars, various search applications, social network applications and web sites, and other information applications and web sites (weather, travel, traffic, dining, entertainment, etc.). Upon waking on the departure day for a business trip, for example, a user may check an airline site for flight status, a traffic application to determine travel time to the airport, a weather application to determine weather conditions in the destination city, restaurant reviews for dining ideas in the destination city, etc.

It is with respect to these and other general considerations that embodiments disclosed herein have been made. Also, although relatively specific problems may be discussed, it should be understood that the embodiments should not be limited to solving the specific problems identified in the background or elsewhere in this disclosure.

SUMMARY

In summary, the disclosure generally relates to user information collections that include relevant information to the user of one or more devices. More specifically, the disclosure generally relates to user information collections that include user directed advertisements for display on the one or more user devices. Such user information collections improve a user's ability to accomplish tasks, save money, and/or get desired products and/or services as opposed to just viewing content. Additionally, the user information collections reduce or prevent unwanted data from being added to the user information collections improving the usability of the data in the user information collections and improving user interactions with the device.

One aspect of the invention is directed to a method for creating and providing a user information collection. The method includes receiving user information, collecting a plurality of user signals associated with a user of at least one device, and receiving a plurality of advertisements. The method also includes making an inference based on the user information and the plurality of user signals. Additionally, the method includes determining a connection between an advertisement from the plurality of advertisements and the inference. Further, the method includes comparing the connection to a confidence threshold. The method also includes updating a user information collection to include the advertisement when the confidence threshold is met. Additionally, the method includes displaying the user information collection on at least one of the devices when at least one display criterion is met.

Another aspect of the invention includes a system. The system comprises a computing device including a processing unit and a memory. The processing unit implements an inference and connection system. The inference and connection system is operable to receive user information, receive a plurality of user signals associated with a user of at least one device, make inferences based on the received user information and the plurality of user signals, determine a connection between the inferences and at least one advertisement, compare the connection to a confidence threshold, and assemble the at least one advertisement into a user information collection.

Yet another aspect of the invention includes a computer-readable storage medium including computer-executable instructions stored thereon. The computer-executable instructions when executed by a computing system in a distributed network cause the computing system to perform a method. The method includes receiving user information, collecting a plurality of user signals associated with a user of at least one device, and receiving a plurality of advertisements. The method further includes making a first inference based on the user information and the plurality of user signals. The method also includes requesting feedback about the first inference and receiving feedback about the first inference. The method also includes making a second inference based on the user information, the plurality of user signals, and the feedback. Additionally, the method includes determining a connection between at least one advertisement from the plurality of advertisements and the second inference. The determining the connection includes considering a time of day and a location of the at least one device. Further, the method includes determining that the connection meets a confidence threshold. Also, the method includes displaying the at least one advertisement and the second inference based on the determining that the connection meets the confidence threshold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

FIGS. 4A-4D are block diagrams illustrating examples of displayed user information collections.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

To retrieve and display desired information on a computing device such as a mobile computer, a user often must access several sources. For instance, in planning for a business trip, a user might consult multiple calendars, various search applications, social network applications and sites, and other information applications and sites (weather, travel, traffic, dining, entertainment, etc.). There is typically no one digital place or application ("app") that gives user relevant information including advertisements in a convenient, easy to understand form. Further, there are typically no systems for ensuring that any information displayed by a device is actually useful, desired, and/or relevant to the user of the device.

Advantageously, the systems and methods described herein monitor a user's activity on one or more devices and request specific user feedback to determine and collect relevant information to the user, including advertisements. Further, the systems and methods described herein compare any determined relevant data to a confidence threshold before including any the data in the user information collection to ensure that the included information is relevant to the user. Moreover, the systems and methods described, in some embodiments, may explain the rationale behind the display of certain data and/or request user feedback about the display of certain data to ensure that collected and displayed information is relevant to the user of the device. As such, user information collections improve a user's ability to accomplish tasks, save money, and/or get desired products and/or services as opposed to just viewing content. Additionally, the user information collections reduce or prevent unwanted data from being added to the user information collections improving the usability of the data in the user information collections and improving user interactions with the device.

Figure 1:
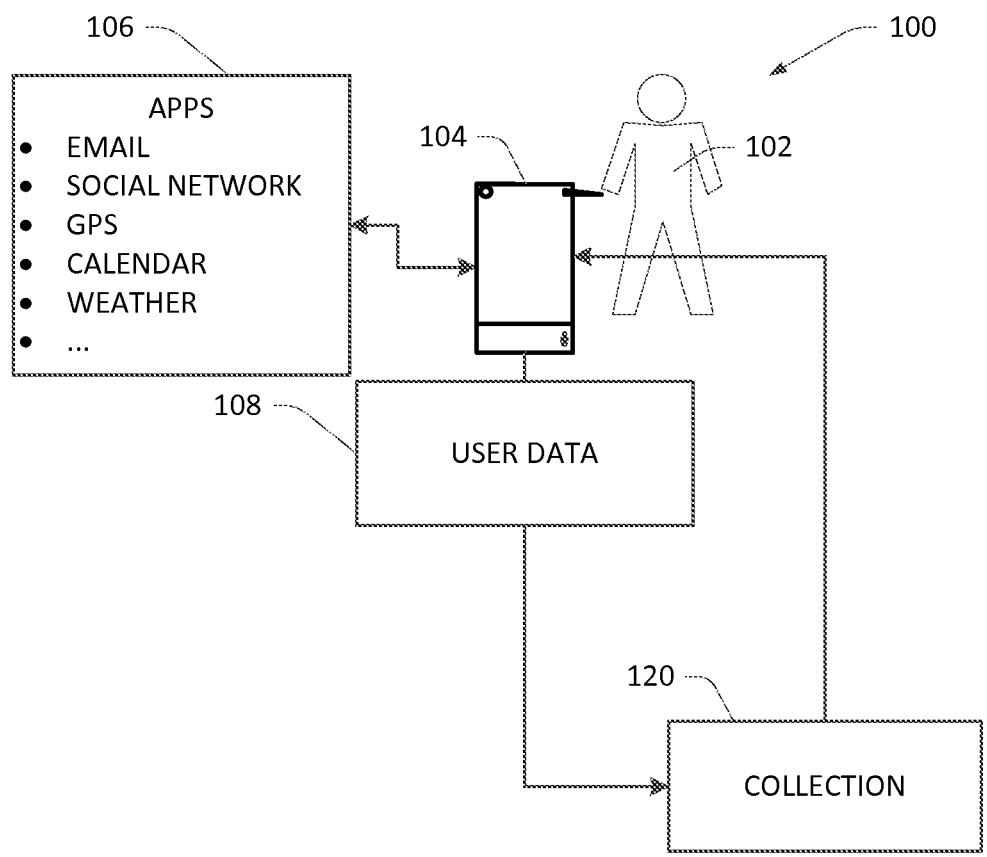
FIG. 1 is a block diagram illustrating an example of a system for displaying a user information collection.

FIG. 1 generally illustrates an example of a system 100 for creating and/or displaying a user information collection. User devices 104, such as mobile computers, gaming systems, desktop computers, and/or smart phones, are associated with a user 102. User data 108 is gathered from one or more of these devices 104. User data 108 includes user information, user signals, and/or user inferences.

The user device 104 is configured to run a plurality of apps 106, such as one or more email apps, social networking apps, global positioning system (GPS) apps, calendar apps, weather apps, etc. Interaction between the user 102 and the various apps 106 operating on the device 104 generate "signals" associated with the user that contain information in various subjects, which can be collected and analyzed. For example, user signals generated by email messages sent and/or received via email apps, social network posts posted and/or read via social network apps, voice recognition of commands, searches submitted via search apps, web sites visited via browser apps, etc. may be evaluated to identify information. Further, signals are not necessarily generated only by overt actions of the user 102. Passive activity or even inaction can generate signals. If the user device 104 is idle for some length of time during some predefined "sleeping" time frame it may be inferred that the user is sleeping, or the location of the device 104 could generate signals without overt interaction between the user 102 and the device 104 and or apps 106 thereon.

User information is information about the user that is directly entered by the user into the one more devices, such as a mobile device. User information includes user feedback. User feedback is information entered directly into the one or more devices that provides specific preferences of the user. The user feedback may be directly or indirectly solicited by the one or more devices. For example, the user information may include age, sex, likes, dislikes, credit card information, activity level, food preferences, news preferences, social preferences, and etc.

User inferences are assumptions about the user that can be made based on the user data, such as signals and user information. The inferences may be utilized to determine relevant information, such as advertisements, for display that may be appreciated by or useful to the user.

Selected pieces of user data 108, such as user information, user signals, and user inferences, and/or determined relevant information, such as advertisements, are assembled into a user information collection 120. The user information collection 120 can be displayed on the device 104 for the user 102. In some embodiments, the user information collection 120 or portions of the user information collection 120 are only displayed when one or more display criterion are met. In some embodiments, the one or more display criterion are based on the user data 108.

Figure 2:
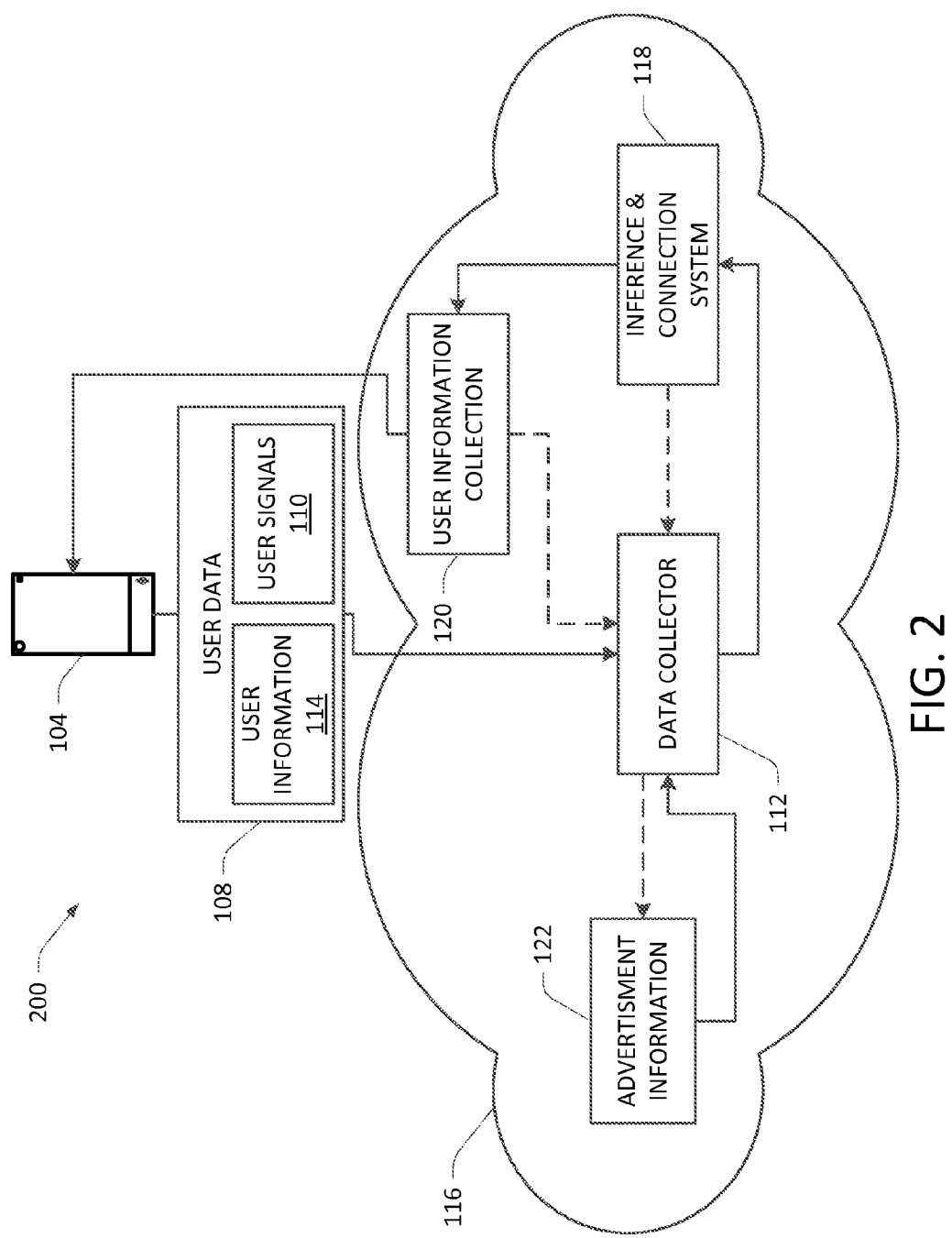
FIG. 2 is a block diagram illustrating an example of a system for creating a user information collection.

FIG. 2 illustrates an embodiment of a system 200 for creating a user information collection 120 that can be displayed on one or more devices 104. As noted above, user data 108, such as user signals 110 and user information 114 are generated by the user's interaction with the device 104 and the apps running thereon. The user data 108 are collected by a data collector 112 that, in the illustrated example, is running on a remote computing system such as a server that is illustrated as running in the "cloud" 116. Although shown as in the cloud 116, those skilled in the art will appreciate that the data collector 112 may run locally or in other environments as well. Moreover, user data 108 could be collected from additional devices associated with the user 102. For example, if the device 104 shown in FIGS. 1 and 2 were a smart phone associated with the user 102, signals could also be collected from the user's desktop computer, laptop, tablet, gaming system, watch, etc. As such, the user's activity on each of the user's devices generates signals about the users.

In some embodiments, a user device 104 is configured to send user data 108 to the data collector 112 periodically (e.g., at predefined time intervals such as once per hour), and/or when the device 104 is connected to a wifi network. The frequency for transmission of user data 108 from the device 104 to the data collector 112 can vary, for instance, based on the type of user data, such as signals 110 or the apps 106 generating the signals 110. In some embodiments, predefined rules are established specifying transmission of user data 108 from the device 104 to the data collector 112. For example, each time a calendar entry is made or changed, or each time an email is sent or received, the corresponding user data 108 could immediately be sent to the data collector 112. Other user data 108 could be sent hourly or daily, or sent each time the device 104 is activated. Additionally, different user devices 104 may be configured to send user data 108 to the data collector 112 based on different times and/or rules.

The data collector 112 collects user data 108 and advertisement information 122. Advertisement information 122 includes advertisements, such as ads, marketing materials, coupons, and/or any other materials associated with an advertisement campaign. The advertisement information 122 in the illustrated example, is running on a remote computing system such as a server that is illustrated as running in the cloud 116. Although shown as connected to the cloud 116, those skilled in the art will appreciate that the advertisement information 122 may run locally, or in other environments as well. In some embodiments, businesses, non-profits, government agencies, and/or other organizations pay to have their advertisements contained in the advertisement information 122 for dissemination to different users of various devices 104.

As discussed above, the data collector 112 collects user information 114. For example, user information may be stored in the form of a user profile that includes information about the user 102. In some embodiments, the user information 114 initially includes static, explicit information about the user 102 that may be provided by the user 102, such as by the user 102 filling out a questionnaire. For example, the user profile may include personal information about the user 102 provided by the user, such as gender, age, occupation, interests, club memberships, hobbies, professional associations, etc. In some embodiments, the user information 114 is received from or extracted from user signals 110. In further embodiments, user data 108 is received and extracted from user voice commands given to and recognized by the device 104.

User signals 110 may include personally-identifiable information (PII), which may include information users do not want others to know. Some common examples of PII are name, birthdate, SSN, account name, phone number, etc. Other data that may be considered PII includes IP address, company name, and location information. The system 200 allows PII to be protected using, for example, redaction, aggregation, encryption, secure storage, limiting access to individuals with a specific business need for the PII, and other suitable protections. In the interest of privacy a user might choose not to have signals 110 collected, but some users will choose voluntarily to allow such signals 110 to be collected to obtain the benefits of the information collections 120 disclosed herein. Appropriate permission to collect user data 108 may be obtained from the user in order to preserve the user's interest in privacy.

The inference and connection system 118 receives user data 108, such as the user signals 110 and user information 114 and identifies various inferences about the user from the user data 108. In some embodiments, the data collector 112 is configured to send user data 108 to the inference and connection system 118 periodically (e.g., at predefined time intervals such as once per hour). The frequency for transmission of the user data 108 to the inference and connection system 118 can vary, for instance, based on the type of signals 110 or user information 114. In some embodiments, predefined rules are established specifying transmission of user data 108 from the data collector 112 to the inference and connection system 118. For example, each time a calendar entry is made or changed, or each time an email is sent or received, the corresponding signals could immediately be sent from the data collector 112 to the inference and connection system 118. Other user data 108 could be sent hourly or daily, or sent each time a device 104 is activated by the data collector 108 to the inference and connection system 118. In other embodiments, the user data 108 is collected directly by the inference and connection system 118 instead of the data collector 112. In these embodiments, the inference and connection system 118 may send user data 108 and user inferences to the data collector 112 for storage. Additionally, while the inference and connection system 118 is shown as operating in the cloud 116 in FIG. 2, as know by a person of skill in the art, the inference and connection system 118 could be implemented locally or in other environments as well. In some embodiments, the inference and connection system 118 is implemented by the device 104.

For instance, if a user is taking a trip including a flight, he or she may need to go to several sites or apps to get necessary or useful information. Desired information could include flight information (e.g., whether the flight is on time), weather in the destination city so the user can pack appropriate clothing, travel time to the departing airport and from the arrival airport (e.g., to determine traffic conditions in the departure and arrival cities), etc. Thus, the user might be required to go to the airline site to get the flight information, consult a weather app for destination city weather forecast, a map app for traffic conditions and directions, among other things. The inference and connection system 118 utilizes the collected user signals and user information regarding this upcoming trip to determine a first user inference or traveling inference that the user is traveling to japan in a month.

In addition to the traveling inference such as described above, the inference and connection system 118 may make other inferences about the user 102 based on the user data 108 received from the data collector 112. For example, embodiments of the system 200 use time of day (e.g. the notions of daily prep time, commuting window, evening meal times, etc.) and location of device 104 to determine or make inferences about the user. The inferences about the user may range from personality, like, dislikes, schedule, social status, activity level, and/or etc. Using user data 108, the inference and connection system 118 may determine several inferences or a "story" of inferences about the user 102 depending on the time, location, and other user circumstances. For example, the inference and connection system 118 may determine that the user is in a relationship, has children, is naturally curious, introverted, likes housework, is knowledgeable about wine, has an active social life, seeks high adrenaline adventures, does not like to travel, rarely eats out on a weekday, and always goes to bed after midnight.

The inference and connection system 118 makes connections between the one or more user inferences and relevant information for display. In some embodiments, the relevant information includes one or more advertisements. In one example as illustrated in FIG. 2, the inference and connection system 118 receives advertisements from the data collector 112. Those skilled in the art will appreciate that the advertisements may be received from other sources as well. For example, the advertisements may be received by the inference and connection system 118 directly from the advertisement information 122 instead of from the data collector 112.

It is useful to display a collection of relevant information that allows a user to accomplish tasks, rather than simply view content. Determining what information is relevant varies from user to user, varies from device to device, and also varies depending on a variety of other factors. For instance, certain information is useful upon waking. However, different users wake up and start their days at different times. Further, the specific information relevant to specific users varies based on schedules, interests, and location among other things.

Accordingly, some disclosed examples provided below illustrate ways a user may see personal, contextually correct information, such as advertisements, at the right time and in a concise manner, rather than simply showing several potentially unrelated data points. This can give the user a "one glance" look at relevant information at appropriate times of the day/week and at appropriate locations. Furthermore, the user can select and influence what information, such as advertisements, he or she wants to see as part of an information collection.

Moreover, information from the inference and connection system 118 may be fed back to the data collector 112 to modify the user data 108 based on inferences and connections, making the user data 108 dynamic. For example, if the user signals 110 indicate the user 102 has a flight reservation on a given day, the inference and connection system 118 may determine a home location of the user 102 from information provided by the user 102 in the user information 114. Alternatively, the inference and connection system could infer the user's home location based on received signals 110. For instance, if received signals 110 indicate the device 104 is consistently stationary at a given location during the hours of 11 PM to 7 AM, the inference and connection system could be configured to infer the user is sleeping during this time and thus the given location is the user's home location. The inference and connection system 118 may infer the location of the user's departure airport based on signals 110 included in flight reservation information from an airlines app and/or emails. In some embodiments, inferences such as these are confirmed by the user before changing user data 108. Once an inference is confirmed, this user feedback may be stored by the data collector 112 as a "confirmed inference." Alternatively, if the inference is not confirmed by the user 102, the inference may be discarded and/or the lack of confirmation may be stored as user feedback by the data collector 112. Based on these pieces of information, the inference and connection system 118 can then obtain information from various subjects such as flight status, a route between the user's home and the destination airport, traffic conditions, estimated travel times, airport restaurant coupons, and assemble this information along with further relevant information into a collection 120 for display on the device 104.

The data collector 112 continually monitors user signals 110 and sends these signals to the inference and connection system 118. As such, the inference and connection system 118 can refine or update the user information collections 120. For example, if location signals indicate the user 102 is typically at a train station prior to flight departures, the inference and connection system 118 can infer that the user 102 takes the train to the airport rather than driving. Accordingly, the information collection 120 can be modified by the inference and connection system 118 to display train departure times on the day of a flight departure. The inference and connection system 118 may also modify the user data 108 to indicate this. Other signals 110 may be used by the inference and connection system 118 to determine relevant information to include in collections 120. If location signals indicate the user is in an area where travelers routinely take taxis to the airport, for example, taxi advertisements and information could be included in the displayed collection 120 rather than traffic or train information. If collected signals 110 indicate the user typically eats at the airport, this information may be saved in the user data 108 and based on this information the collection 120 could be updated by the inference and connection system 118 to include airport restaurants advertisements.

However, users of devices 104 may be very unhappy if their device repeatedly displays information that is unwanted or irrelevant to the user and, more particularly, if the information is advertisements. As such, the inference and connection system 118 compares any determined connection to a confidence threshold. The confidence threshold is a determination of how accurate or how confident the inference and connection system 118 is about a determined connection between an inference and relevant information for display.

For example, the inference and connection system 118 may make inferences that the user usually eats lunch around this time of day and that the user often eats pizza to determine a connection between several advertisements for pizza restaurants located near the current location of user and these inferences. However, the inference and connection system 118 may determine that it is only 80% sure that the pizza restaurant coupons will be relevant to the user. If the confidence threshold is 95%, then the inference and connection system 118 would not update the user information collection with the pizza coupons or other advertisement collateral. In an alternative example, if the connection system receives inferences from the inference and connection system 118 that the user usually eats lunch around this time of day, the user often eats pizza, the user has eaten at three different specific pizza restaurants in the past to determine a connection between these inferences and coupons for two of the pizza restaurants the user previously ate at located near the current location of user. Now, the inference and connection system 118 may determine that is it is 98% sure that this pizza restaurant coupons will be relevant to the user. If the confidence threshold is still 95%, then the inference and connection system 118 would update the user information collection with the pizza coupons.

In some embodiments, a determined connection between one or more inferences and information excluding advertisements may have a lower confidence threshold than a confidence threshold for a determined connection between one or more user inferences and one or more advertisements. For example, a connection between user inferences and display information excluding advertisements may be 75%, 80%, or 90%, while the confidence threshold for a connection between user inferences and advertisements may be 95%, 98%, or 100%. In some embodiments the user can input, select, or modify the confidence threshold. In other embodiments, the user can input, select, or modify the confidence threshold specifically for advertisements. For example, the user may select that relevant information based on a determined connection by the inference and connection system 118 only be displayed if the connection system 95% or 100% confident about the connection. In other embodiments, the user can select that advertisements or other relevant information from a determined connection never be displayed or added to the user information collection.

The inference and connection system 118 compares any determined relevant data to a confidence threshold before including any determined data in the user information collection to ensure that the information is relevant to the user. As such, the user information collections improve a user's ability to accomplish tasks, save money, and/or get desired products and/or services by displaying highly relevant data to the user, such as advertisements. Additionally, the utilization of the confidence threshold also prevents unwanted data from being added to the user information collections improving the usability of the data in the user information collections and improving user interactions with the device because the user will not have to sift through unwanted and/or irrelevant information.

Regardless of whether the displayed relevant information is useful or not to the user, the user may be confused by or interested in how the displayed relevant information was determined. As such, in some embodiments, the inference and connection system 118 provides context for the displayed relevant information in the user information collection, such as displaying the one or more user inferences relied upon to make the connection to the displayed relevant information. For example, based on the pizza coupon example listed above, in addition to displaying the pizza coupons, the user information collection 120 may list next to the coupons that it is lunch time and that the user liked these pizza restaurants in the past, which are some of the inferences utilized by the inference and connection system 118 to make the connection to the coupons. Now the user knows the context for the presentation of information and may be less annoyed if this information is not relevant or is not useful to the user. Additionally, the presentation of the inference may allow the user to provide feedback about the displayed inference.

The inference and connection system 118 may explain the rationale behind the display of certain data to enlighten the user about whey inference and connection system 118 assumes that the collected and displayed information is relevant to the user of the device. As such, user information collections improve a user's ability to accomplish tasks, save money, and/or get desired products and/or services as opposed to just viewing content because the user can provide feedback on this provided rational to correct or affirm determined inferences and connections to ensure that future data displayed is relevant to the user. Further, in the rare case where irrelevant data is displayed to the user, providing an explanation of why the data was provided may improve a user's response to the displayed unwanted data and overall experience and interactions with device.

In some embodiments, the user feedback is directly solicited by the inference and connection system 118. For example, based on example travel inference discussed above, the inference and connection system 118 may request that the user confirm that he or she is traveling to Japan in a month in the displayed user information collection 120. As discussed above, user feedback confirming this inference is stored as a confirmed inference by the data collector and utilized by the inference and connection system 118 to make new connections with relevant information or adjust previously determined connections to relevant data. Additionally, user feedback denying this inference is stored as a denied inference by the data collector 112 and utilized by the inference and connection system 118 to make new connections with relevant information or adjust previously determined connections to relevant data. Alternatively, in this example, the user may ignore the request for direct feedback. In this case, the inference and connection system 118 may disregard the inference or maintain the inference with lower confidence.

In other embodiments, the user may provide feedback about any information displayed by the user information collection 120 on the device 104. In additional embodiments, the user may provide feedback on a predetermined portion of the information displayed by the user information collection 120 by the user device. In some embodiments, the user feedback is not directly solicited by the inference and connection system 118. For example, in the pizza coupon example, the user may select the inference that the user likes pizza and then select that between one or more statements about the inference, such as always true, sometimes true or never true. Receiving user feedback, such as always true, sometimes true, or never true is stored as a confirmed inference by the data collector 112 and utilized by the inference and connection system 118 to make new or adjust previous connections with relevant information. In an alternative example, the user may select to never display pizza coupons or any types of coupons or other advertising/ marketing collateral. In response to this type of user feedback, the inference and connection system 118 may change one or more display criterion for all or a portion of the user information collection 120.

The inference and connection system 118 monitors a user activity on one or more devices and monitors solicited and unsolicited specific user feedback to determine and collect relevant information including advertisements to the user. As such, user information collections improve a user's ability to accomplish tasks, save money, and/or get desired products and/or services by displaying highly relevant data, such as advertisements to the user. Additionally, this analysis of this feedback also prevents unwanted data from being added to the user information collections improving the usability of the data in the user information collections and improving user interactions with the device because the user will not have to sift through unwanted and/or irrelevant information.

In some instances, the exact moment the user information collection 120 is updated might not be a good time to notify the user of new relevant information. As utilized herein, the term "new" is utilized to describe user data (e.g., user information, user signals, user inferences, and etc.), relevant information (e.g., traffic information, advertisements, and etc.), connections, user information collections, and/or contexts that are different from previously determined, received displayed, and/or collected user data, relevant information, connections, user information collections, and/or contexts. For example, the user may be asleep or in a meeting. As such, in some embodiment, the user information collection 120 or a portion of the user information collection is only displayed on one or more devices 104 associated with user when one or more display criterion are met. The display criterion may be constant, vary based on the device (e.g. smart phone versus gaming system), vary based on the determined relevant information (such as advertisements, weather information, etc.), vary based on the user (e.g., a user that works at night versus a user that sleeps at night), and/or be selected or modified by the user (e.g., user selects to never display advertisements, user selects that only coupon advertisements be displayed, user selects not to show weather information, and etc.). As such, if the one or more display criterion is not met for the user information collection 120 or a portion of the relevant information collection, then the user information collection 120 or the portion of the user information collection 120 is not displayed on the device 104. The inference and connection system 118 may continuously monitor for the display criteria based on the received user data 108 and will display the relevant information as soon as the one or more criteria is met as long as the information remains relevant to the user.

In some embodiments, the one or more display criterion is a time of day (e.g., only display relevant information when the user is normally awake), a location of the user (e.g., do not display information when the user is commuting to work), a time period prior to or during a calendared event (e.g., do not display relevant information during a work meeting), a determined user action (e.g., do not display relevant information unless the user is actively utilizing the device), an update to the user information collection 120, and/or a received request for relevant user information (e.g. receive a user voice command requesting relevant information, such as an advertisement). This list is exemplary only and is not meant to be limiting. It appreciated by a person of skill in the art that other display criteria may be utilized by the inference and connection system 118. For example, in some embodiments with a device that has voice recognition, the user may verbally request advertisements, such as coupons, for nearby restaurants meeting the display requirement of a received user request for relevant information, and more specifically in this case, a request for an advertisement.

Figure 3:
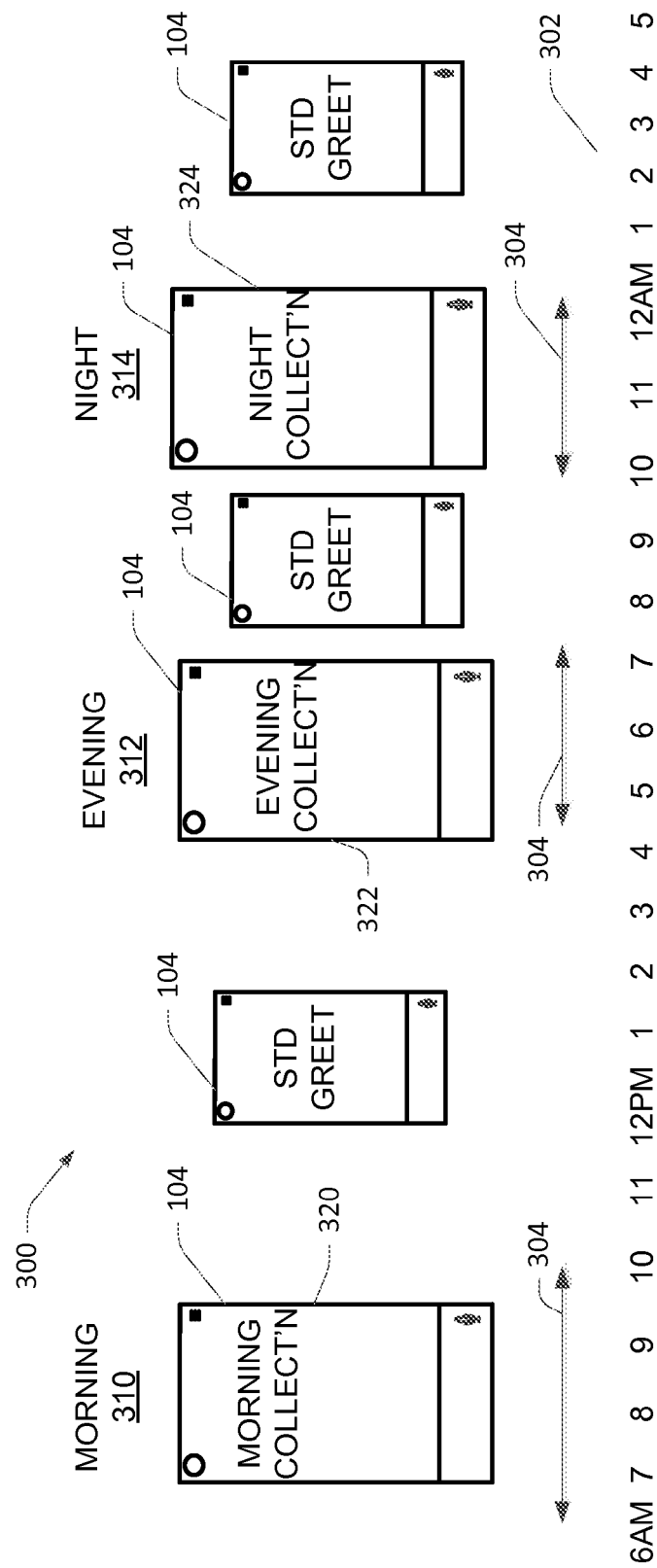
FIG. 3 is a block diagram illustrating an example of user information collections associated with themes.

FIG. 3 illustrates an example of a weekday planner 300, including morning, evening and night themes 310, 312, 314. The user collection 120 displayed on the user device 104 may vary depending on the time of day, the collected signals 110, user information 114 and inferences based thereon. In some implementations, the inference and connection system 118 infers the user's waking time based on user information 114 and/or collected signals 110 such as device start up or unlock, alarms set, device location, etc.

The weekday planner 300 includes a morning theme 310, an evening theme 312 and a night theme 314. A timeline 302 shows example time frames 304 for the themes 310, 312, 314. For example, the inference and connection system 118 may determine that the user 102 leaves for work at 8 AM based on collected user data 108. The morning theme 310 includes a morning collection 320 that is displayed on the device 104 during a time window 304 of two hours before and one hour after the inferred time the user leaves for work. The evening collection 322 is displayed for one hour before and two hours after the user 102 leaves work, and the night collection 324 is displayed for one hour before and one hour after the user's 202 bed time, for example.

The morning collection 320 may include pieces of relevant information from different subjects that are relevant to one another. As used herein, the term subject generally refers to a category of information. For example, the morning collection could include information in a weather subject (e.g., weather conditions and forecast), a commuting subject (e.g., commute time, time of first appointment, advertisements for coffee shops nearby the first appointment, and etc.), a news subject (e.g., headlines and links to news), a calendar subject (e.g., upcoming calendar conflicts), and the like.

The particular pieces of information included in the information collection 320 are not necessarily static. Initially, the displayed collection 320 could be based on a standard, default collection of information, or it could be based on initial inferences based on collected user data 108. For example, if the user 102 rarely selects the news headlines link in the news information, the new headline could be replaced in the inference and connection system 118 by another piece of relevant information. If collected user data 108 indicates an interest in a new smart phone, for example, an indication of the prices for the latest smartphone for select carriers may be included in the user information collection 320 displayed on the device 104 in the morning theme 310.

In some embodiments, the user information collection 120 includes a user greeting. The greeting provides a start to the relevant information collection and can help introduce the content to the user. The example contextual greeting 402 for the morning theme states, "I've gathered a look at your day today," introducing the user 102 to the displayed morning information collection 320 as illustrated in the example user information collection displayed in FIG. 4C. Referring again to FIG. 3, during times between the morning, evening and night themes 310, 312, 314 a standard greeting 320 may be displayed, such as "Hello! How can I help you?" The morning greeting 302 and standard greeting 320 are illustrated as text on the device 104, though in some embodiments an avatar is included, and/or an audio greeting is played when the user 102 unlocks the device 104, for example. In some implementations, one or both of the standard and contextual greeting is also personalized, such as greeting the user 102 by name.

As the inference and connection system 118 makes further inferences based on collected user data 108, the pieces of information displayed in the user information collections and the greetings presented therewith may be modified to be even more personalized and relevant to the user 102. For example, if the inference and connection system 118 determines that the user 102 regularly watches movies in the evening (based on device context signals, for example), the greeting for the evening display could state, "How about a movie?" The evening information collection 322 could accordingly include a link to a coupon for a nearby movie theater. If the inference and connection system 118 determines that the following day is particularly busy (based on calendar signals, for example), the night greeting could state, "Tomorrow looks like a busy day." The user information collection could then include information from calendar signals, social network signals, etc. to give the user 102 an overview of his or her day ahead. In some implementations, the greeting and information collection is based on user historical patterns. Instead of simply determining the user 102 has a busy day based on some threshold number of appointments, the inference and connection system 118 is configured to evaluate user history regarding appointments, for example, and make a determination whether the indicated future activity is indeed greater than "normal" user patterns. In some embodiments, a plurality of predefined greetings may be stored, and one of the predefined greetings may be selected for display on the user device 104 based on received user data 108, such as time of day, or based on inferences made based on the received user data 108, such as an inferred busy day based on calendar signal trends.

The user collection displayed on the device 104 may be based on signals indicating information other than time of day. Upon landing at the destination, a flight arrival theme may be employed. Based on collected user data 108 (signals 110 indicating device location, for example), the inference and connection system 118 determines that the user 102 has landed at the destination and based thereon, displays a user information collection 120 that includes information such as local weather and traffic conditions, a link to rental car and hotel sites, etc. In some examples, a contextualized greeting is further displayed or played, for example, "Welcome to your destination! I've gathered some info for your stay."

Figures 4C, 4D:
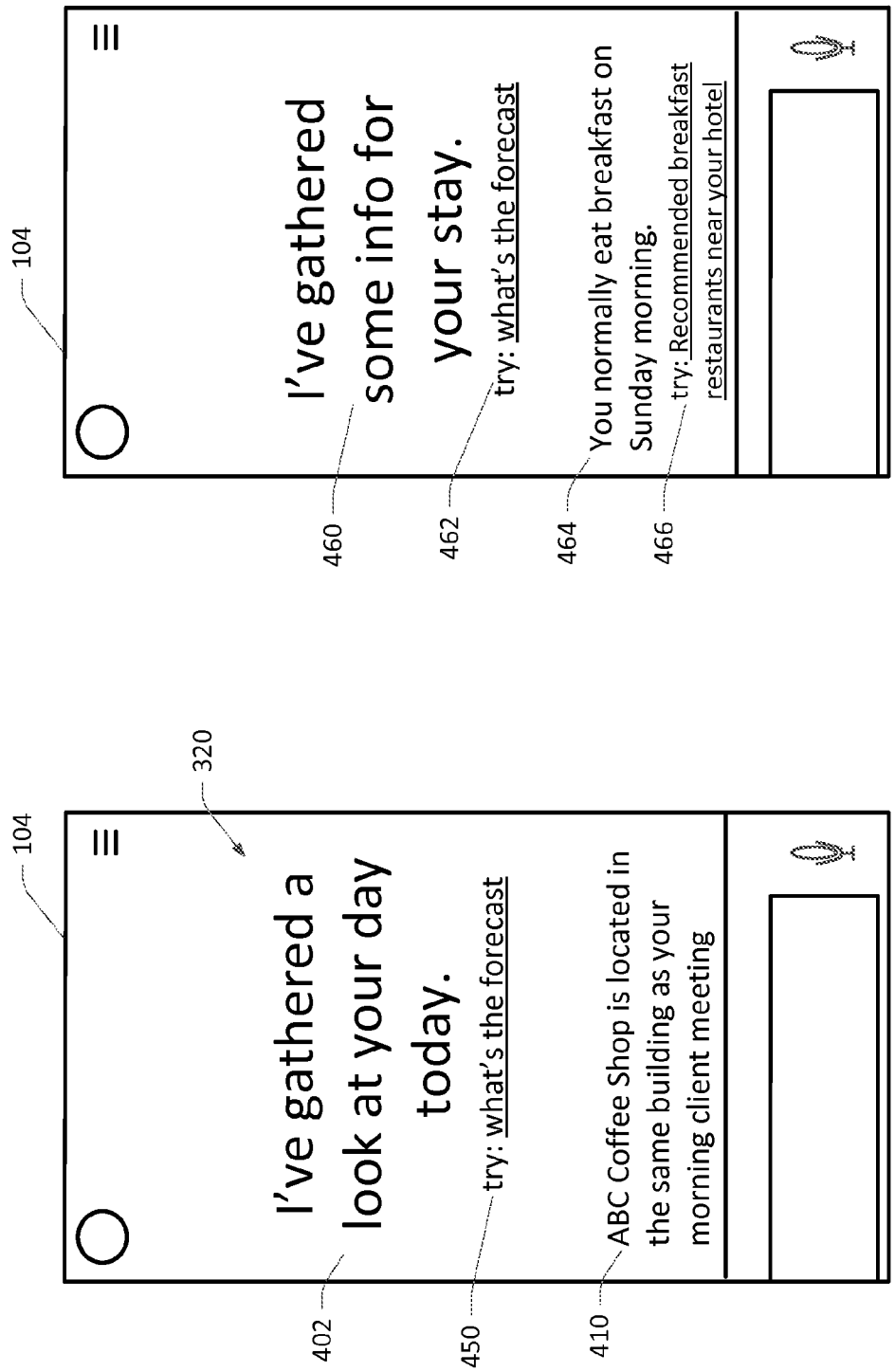

FIG. 4D illustrates an example of a user information collection 460 for arrival at a hotel that is determined based on collected user data 108 (user signals 110 indicating the device location). The travel collection 460 could be displayed for a time frame 304 of two hours after a determined arrival at the hotel, for example. The illustrated travel collection 460 displayed on the device 104 shown in FIG. 4D includes a contextual greeting 460 that states, "I've gathered some info for your stay." The displayed information includes a link to the forecast 462, a determined inference about the user's breakfast habits for this day and time 464 and a link to advertisements for breakfast restaurants located near the user's hotel 466.

In some embodiments, contextual greetings are displayed without the entire information collection being displayed. FIG. 4C illustrates an example of the device 104 where the user greeting 402 for the morning theme 310 is displayed, with only a "peek" at the user information collection. For example, a single piece of relevant information 410 (a coffee shop advertisement) may displayed, along with an invitation to a suggested link 450 to a web link. If desired, the user 102 can scroll to view the entire morning collection 320.

FIGS. 4A and 4B provide examples of displayed user information collection that include user directed advertisements. In the example user information collection displayed in FIG. 4A, the inference and connection system 118 made several inferences about the user, such as the user's anniversary is next Thursday, the user bought flowers last year for the anniversary, and the user has not purchased flowers this year for the anniversary. Based on these inferences, the inference and connection system 118 made an inference that the user may want to buy flowers this year. The inference and connection system 118 determined a connection between some advertisements (coupons for flower shops previously utilized by the user) and these inferences. As such, the inference and connection system 118 updated the user information collection with flower shop coupons 414, and several of the inferences 406 that led to the display of these coupons 414 to provide context for the user. Additionally, the inference and connection system 118 chose to display some additional relevant information 408 that explained the relevance of the coupons listed below by reciting, "Here are some coupons for nearby florists." Further, the example user information collection 120 displayed in FIG. 4A also provides an icon for indirect feedback that if selected by user allows the user to provide feedback about the listed coupons.

In the example user information collection 120 displayed in FIG. 4B, the inference and connection system 118 made several inference about the user, such as the user is a foodie, the user usually eats dinner around this time, and the user likes to eat at restaurants with high accolades. The inference and connection system 118 determined a connection between an advertisement for Michelin Star Restaurant that included available reservation times and these inferences. As such, the inference and connection system 118 updated the user information collection 120 with an advertisement for the restaurant 434 and several of the inferences 432 that led to the display of the restaurant advertisement 434 to provide context for the user. Additionally, the inference and connection system 118 chose to display some additional relevant information 444 about the advertised restaurant such as a link to the website for the Michelin Start Restaurant and the location of the Michelin Star Restaurant. Further, the example user information collection displayed in FIG. 4A solicited the user for direct feedback 436 about the listed inference 432. The solicited direct feedback 436 requested that the user confirm that the user is a foodie.

Figure 5A:
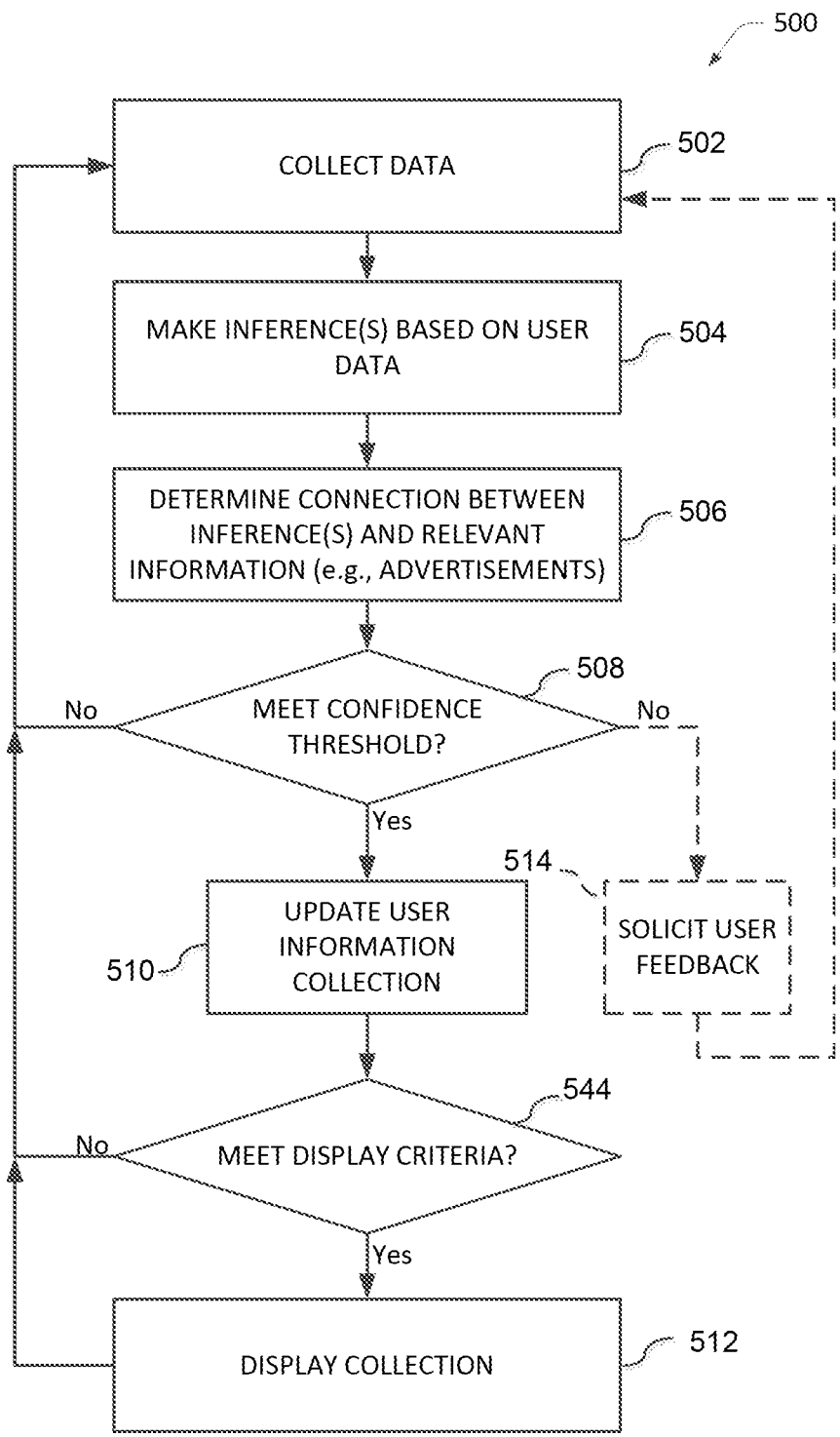
FIG. 5A is a flow diagram illustrating an example of a method for creating a user information collection.

FIG. 5A is a flow diagram conceptually illustrating an example of an information collection method 500. At operation 502, a plurality of data is collected. The data includes relevant information (e.g., advertisement information, weather information, traffic information, and etc.) and user data (e.g., user information, user signals, and user inferences). As noted above, user data 108 is generated from user interactions with the device 104 and the apps running on the device 104. As noted above, in some embodiments, user data 108 is sent from the device 104 to the inference and connection system 118 or to the data collector 112 at various times, such as predefined time intervals or when the device 104 is connected to a wifi network. For example, emails, social media posts, calendar appointments, GPS location information, etc. may be sent from the device 104 to the inference and connection system 118 or to the data collector 112. Further, as discussed above, in some embodiments, the inference and connection system 118 receives one or more advertisements from the data collector 112 or from the advertisement information 122 at various times, such as predefined time intervals or when the device 104 is connected to a wifi network.

In some embodiments, a plurality of initial user information is received or collected, a plurality of user signals are received or collected, and a plurality of advertisements are received or collected at operation 502. In additional embodiments, relevant information is collected or received at operation 502 in response to instructions from the inference and connection system 118. In some embodiments, initial user information is information about the user that is directly entered by the user via a device 104 as part of the configuration of the device 104. In other embodiments, the initial user information is the first information received or collected that was directly entered by the user. In further embodiments, additional user information is received or collected at operation 502. The additional user information is information about the user that is directly entered by the user via the device 104 and is received or collected after the initial user information. In some embodiments, the user information (initial and/or additional) includes user feedback. In some embodiments, initial user signals are received and collected at operation 502. The initial user signals are a first set of signals received or collected from device 104. In further embodiments, additional user signals are received or collected at operation 502. The additional user signals is any additional set of signals received or collected from the device 104 after the initial user signals are received and collected. In further embodiments, the user data includes inferences and/or connections from the inference and connection system 118. In some embodiments, user data is continuously monitored, received, and/or collected at operation 502.

Examples of various user data 108 associated with a user 102 of a device 104 may include a membership signals (e.g., a gym membership may be used to identify a workout location for the user; a movie club membership may be used to identify a preferred movie theater and/or coupons for the user; etc.), social network signals (e.g., an "I signed up for a marathon" post may be used to identify an interest in fitness or running; a "lets meet for dinner" message may be used to identify a preferred dining location or cuisine; etc.), device context signals (e.g., connectivity state and/or location may be used to determine wake or sleep times; user data such as email messages and task lists may be used to determine planned future activities and locations; etc.), real-time data signals (e.g., gym hours; traffic conditions to estimate travel times; a closing of a coffee shop that the user routinely visits on Saturday; etc.), activity data signals (e.g., a preferred stop for coffee before work may be identified based upon device locations of the device 104 corresponding to early morning times; children's after school activities may be identified based upon device locations of the device 104 corresponding to a soccer field at late afternoon times; etc.), calendar signals (e.g., meetings, appointments, etc.) and/or etc.

Figure 5B:
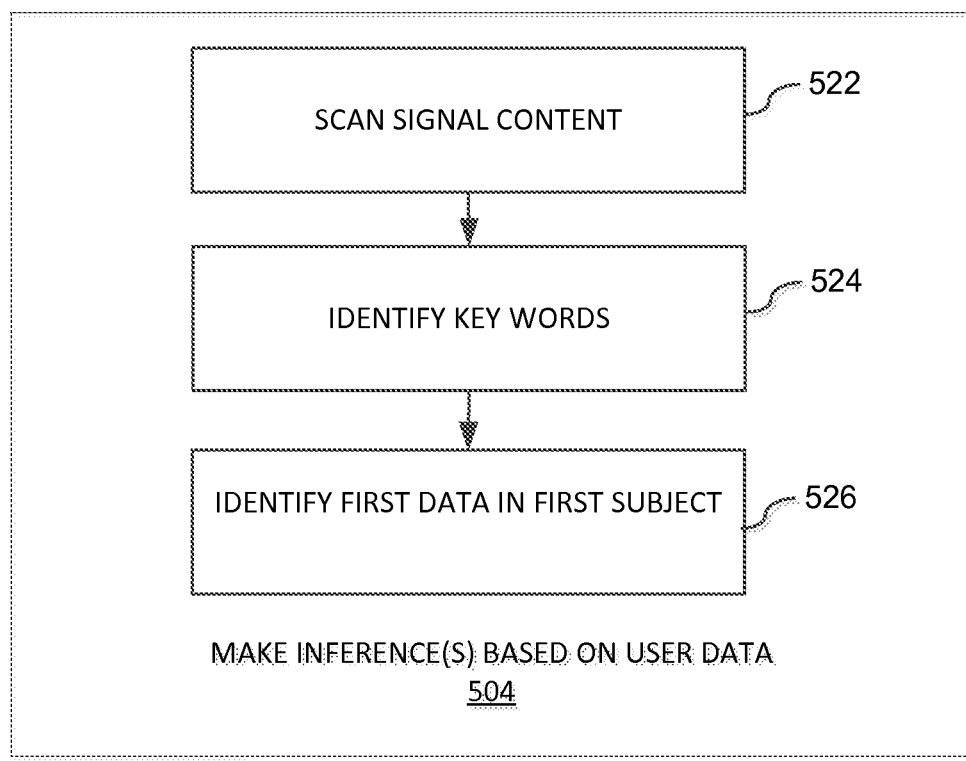
FIG. 5B is a block diagram illustrating an example of a method for making user inferences as displayed in FIG. 5A.

One or more inferences are made or determined about the user from the user data at operation 504. In some embodiments, operation 504 includes scanning operation 522, identifying key words operation 524, and identifying first data operation 526, as illustrated in FIG. 5B. The received user data is scanned at operation 522 by the inference and connection system 118 for predefined key words and/or phrases that indicate relevant data is included in the received signal. In some implementations, the inference and connection system 118 has rules programed therein for reviewing user data 108 to determine relevance. In other embodiments, the inference and connection system 118 may identify relevant data in the received user data 108. The key words and phrases are identified at operation 524, indicating relevant data. Relevant data is grouped into subjects. The key words that identify relevance may, for example, be associated with predefined subjects. Thus, at operation 526, data identified from the identifying key words operation 524 is associated with the proper subject. For example, the inference and connection system 118 can be configured to scan emails and calendar appointments to identify key words associated with a flight subject, such as airport codes, flight numbers, airline confirmation codes, etc. When these key words are identified, the inference and connection system 118 makes an inference that the user 102 has booked a flight. The inference and connection system 118 during operation 504 may go on to make other inference about this booked flight by reviewing the received user data 108, such as the travel date, the location of the destination, whether trip is personal or business related, and etc.

Referring again to FIG. 5A, a connection between the one or more inferences and relevant information is determined at operation 506. In some embodiments, the relevant information is received or collected from the received user data 108. However in other embodiments, the relevant information is received and/or collected from other sources, such as advertisement information 122, real-time data signals, or other data sources accessible to the inference and connection system 118 that is separate from the user data 108. In some embodiments, the connection between the one or more inference and the relevant information is further determined by considering user data 108 at operation 506. For example, the connection may be determined at operation 506 by considering the time of day and/or the location of the user.

Referring back to the inference that the user has booked a flight, the inference and connection system may connect this inference with relevant information (e.g., flight number, departure time, airline, weather for the determined trip dates, advertisement for airport shuttles, advertisements for airport restaurants, and/or etc.) and then associate this information with the booked flight. As noted herein above, the displayed user collections may include information from multiple subjects accumulated from various inferences.

The determined connection is compared to a confidence threshold at operation 508. If the connection meets or exceeds the confidence threshold at operation 508, operation 510 is performed and the user information collection is updated to include at least the relevant data. If the connection does not meet the confidence threshold at operation 508, operation 502 is performed and the user information collection is not updated with the determined connection. In some embodiments, if the connection does not meet the confidence threshold at operation 508, soliciting operation 514 is also performed. As discussed above, the confidence threshold may vary from device to device and from user to user. In some embodiments, the user may select, input, or change a confidence threshold. Additionally, a higher confidence threshold may be necessary if the relevant information is an advertisement. In some embodiments, the confidence threshold is 100%, 99%, 98% 97%, 96%, 95%, 94%, 93%, 92%, 91%, 90%, 85%, 80% or 75%. This list is exemplary only and is not meant to be limiting. A person of skill in the art would understand that any confidence threshold above 50% may be utilized by system 100, system 200 and/or method 500. For example, referring back to the inference that the user has booked a flight, a confidence threshold for the relevant information of flight times, destination weather, flight number, traffic to the airport may require a confidence threshold of 80%, while the airport shuttle advertisements and the airport restaurant advertisements may require an advertisement confidence threshold of 98%.

In some embodiments, even though the user information collection is not updated to include the determined connection because the determined connection does not meet the confidence threshold, the user information collection is still updated to request additional user information, such as direct feedback about one or more user inferences and/or one or more determined connections, at operation 514. In some embodiments, the one or more user inferences and/or the one or more determined connections are directly related to the determined connection that did not meet the confidence threshold.

At operation 510 of FIG. 5A, the user information collection is updated to include the relevant information from a determined connection, one or more determined user inferences, and/or a request for additional user information, which may be displayed on the device at operation 512. The updating of the user information collection includes creating or assembling a new user information collection and includes updating a previously created and stored user information collection.

As discussed above, in some embodiments, the relevant information to be included in information collections are predetermined and stored in the data collector 112 as an information collection "templates" that may be associated with collection themes. Referring back to the user collection 460 for the hotel arrival theme, information link 462 regarding local weather is displayed on the device 104. In the example shown in FIG. 4D, the user collection 460 displayed includes information from one or more related ("connected") subjects, such as restaurant advertisement for a breakfast restaurant recommendation 466.

Predefined user collection templates may be established and stored in the data collector 112. Such predetermined collections, such as the hotel arrival theme collection 460 shown in FIG. 4D, may be modified based on received user data 108. As described above, if the user data 108 indicates that the user 102 does not routinely go out for breakfast while traveling, the second set of relevant information 464 and 466 may be replaced by a more relevant subject (e.g., "nearby attractions" subject if the user data indicates that the user 102 routinely goes sightseeing while on vacation). The modified collection template may then be stored by the data collector 112. The information collection template, for example, may include various related subjects, as well as desired information from the related subjects to be included in the collection. As these pieces of information are identified (e.g., by analyzing received user data 108 and user inferences to determine connections to relevant data), the information is added to the collection template and stored in the data collector 112.

Regardless of whether the displayed relevant information is useful or not to the user, the user may be confused by or interested in how the displayed relevant information was determined. As such, in some embodiments, the user information collection is updated to display a context for the displayed relevant information, such as displaying the one or more user inferences relied upon to make the connection to the displayed relevant information at operation 510. Additionally, the presentation of the inference and/or context allows the user to provide feedback about the displayed context and/or inference. In further embodiments, the user information collection is updated to solicit direct user feedback about one or more the displayed relevant information at operation 510. In alternative embodiments, the user information collection is updated to request indirect user feedback by providing a feedback selection option that allows the user to provide feedback on any part of or on select displayed relevant information upon user selection at operation 510. As discussed above, received user feedback confirming an inference is stored as a confirmed inference during operation 502 and may be utilized to make new or to confirm previous user inferences at operation 504 and to make new connections or to change the confidence in previously determine connections with relevant information at operation 506. Additionally, user feedback denying an inference is stored as a denied inference at operation 502 and utilized to make new or to confirm previous user inferences at operation 504 and to make new connections or to change the confidence in previously made connections with relevant information at operation 506. If the user ignores a direct request for feedback, the inference and any connection determined therefrom may be disregarded or maintained with lower confidence at operations 504 and 506. Received user feedback about any displayed relevant information is stored as user information during operation 502 and may be utilized to make new or confirm previous user inferences at operation 504 and to make new connection or to change the confidence level of previously made connections with relevant information at operation 506.

In some embodiments, the user information collection is updated at operation 510 to include a one or more advertisements. In further embodiments, the user information collection is updated at operation 510 to directly and/or indirectly request user feedback about the one or more advertisements.

Operation 544 is performed after operation 510 as illustrated in FIG. 5A. Once the user information collection is updated, further user data 108 is compared to one or more display criterion at operation 544. If the one or more display criterion is met for the updated information collection or a portion of the information collection during operation 544, the collection is displayed at operation 512. At operation 512 the updated user information collection or a portion of the updated information collection is displayed on the device 104. If the one or more display criterion is not met during operation 544, the updated collection or a portion of the updated user information collection is not displayed and operation 502 is performed. The updated collection may be saved for later display or discarded. Example display criteria include time of day, a time period prior to a scheduled event, location of the user, a received user request for an advertisement, a received user request for additional information, an update to the user information collection, a determination of a predetermined user action, and/or etc.

Referring again to the hotel arrival theme collection 460 discussed above, the collection could be displayed at some predetermined time or within a predetermined time window prior to or after arrival at the hotel. Thus, if user data 108 from the device 104 indicates a time that meets the criteria, the collection 460 is displayed. In some embodiments, the user is asked whether he or she would like to view a user information collection prior to displaying it. In this case, the display criteria would further include the user's desire to view the display. Additional criteria checked at operation 544 could include the user's location. For instance, if the user is located outside a given distance from the hotel, the inference and connection system 118 could infer that the user 102 is no longer located at the hotel. This user data 108 would therefore indicate that all of the display criteria are not met as determined in operation 544, and the hotel arrival theme collection 460 would not be displayed.

Referring again to the weekday planner 300 illustrated in FIG. 3, the morning collection 320 for the morning theme 310 is displayed during a time window 304 of two hours before and one hour before the user 102 leaves for work. Thus, the display criteria would include such time frame criteria. Additional criteria for displaying the morning collection 320 may include location criteria, such as the user 102 being located at a home location. For instance, if the user 102 activates the device within the appropriate time window 304 defined by the criteria, but location signals indicate the user 102 is already located at his or her work location, the display criteria is not met at operation 544 and the morning collection 320 would not be displayed and operation 502 is performed instead. The commute time information and coffee shop locations, for example, would no longer be relevant to the user 102 if he or she is already at work.

In some embodiments, the displayed updated collection includes relevant information based on the determined connection. In these embodiments, the user data, such as user signals, may be specifically monitored at operation 502 for information that could indicate whether a user actually utilized the displayed relevant information. This specific user information is received and utilized by the inference and connection system 118 at operation 504 to make additional user inferences. For example, in some embodiments, one or more advertisements may be included in the displayed updated user information collections. In these embodiment, user data 108, such a selection of a coupon, use of a coupon, a purchase at the advertised business, a location of the user at an advertised business and/or etc. may be monitored and/or collected at operation 502 and sent on to the inference and connection system 118. The inference and connection system 118 may utilize this data at operation 504 to make one or more inferences about whether or not the user utilized a displayed advertisement. Theses inference about whether any given advertisement was utilized by the user are then utilized to make additional connections with relevant information and/or to change the confidence level in previously determined connections.

Thus, the display of user information collections improve a user's ability to accomplish tasks, save money, and/or get desired products and/or services as opposed to just viewing content.

In some embodiments, a system for creating and providing user information collections is provided. This system includes means for receiving initial user information and means for collecting a plurality of user signals associated with a user of at least one device. This system further includes means for making a first inference based on the initial user information and the plurality of user signals, means for receiving a plurality of advertisements, and means for determining a first connection between a first advertisement from the plurality of advertisements and the first inference. Additionally, this system includes means for comparing the first connection to a confidence threshold, means for updating a user information collection to include the first advertisement when the confidence threshold is met; and means for displaying the user information collection on the at least one device when at least one display criterion is met.

In other embodiments, a system comprising a computing device including a processing unit and a memory is provided. In this system, the processing unit implements an inference and connection system. The inference and connection system includes means for receiving initial user information, means for receiving a plurality of initial user signals associated with a user of at least one device, and means for making inferences based on the initial user information and the plurality of initial user signals. The inference and connection system further includes means for determining a connection between the inferences and at least one advertisement, means for comparing the connection to a confidence threshold, and means for assembling the at least one advertisement into a user information collection.

In additional embodiments, a system for creating and providing user information collections is provided. This system includes means for receiving user information and means for collecting a plurality of user signals associated with a user of at least one device. This system further includes means for making a first inference based on the user information and the plurality of user signals, means for requesting user feedback about the first inference and means for receiving the user feedback about the first inference. This system also includes means for making a second inference based on the user information, the plurality of user signals, and the user feedback, means for receiving a plurality of advertisements, and means for determining a connection between at least one advertisement from the plurality of advertisements and the second inference. The means for determining the connection includes considering a time of day and a location of the at least one device. Additionally, this system includes means for determining that the connection meets a confidence threshold and means for displaying the at least one advertisement and the second inference based on the determining that the connection meets the confidence threshold.

Figure 6:
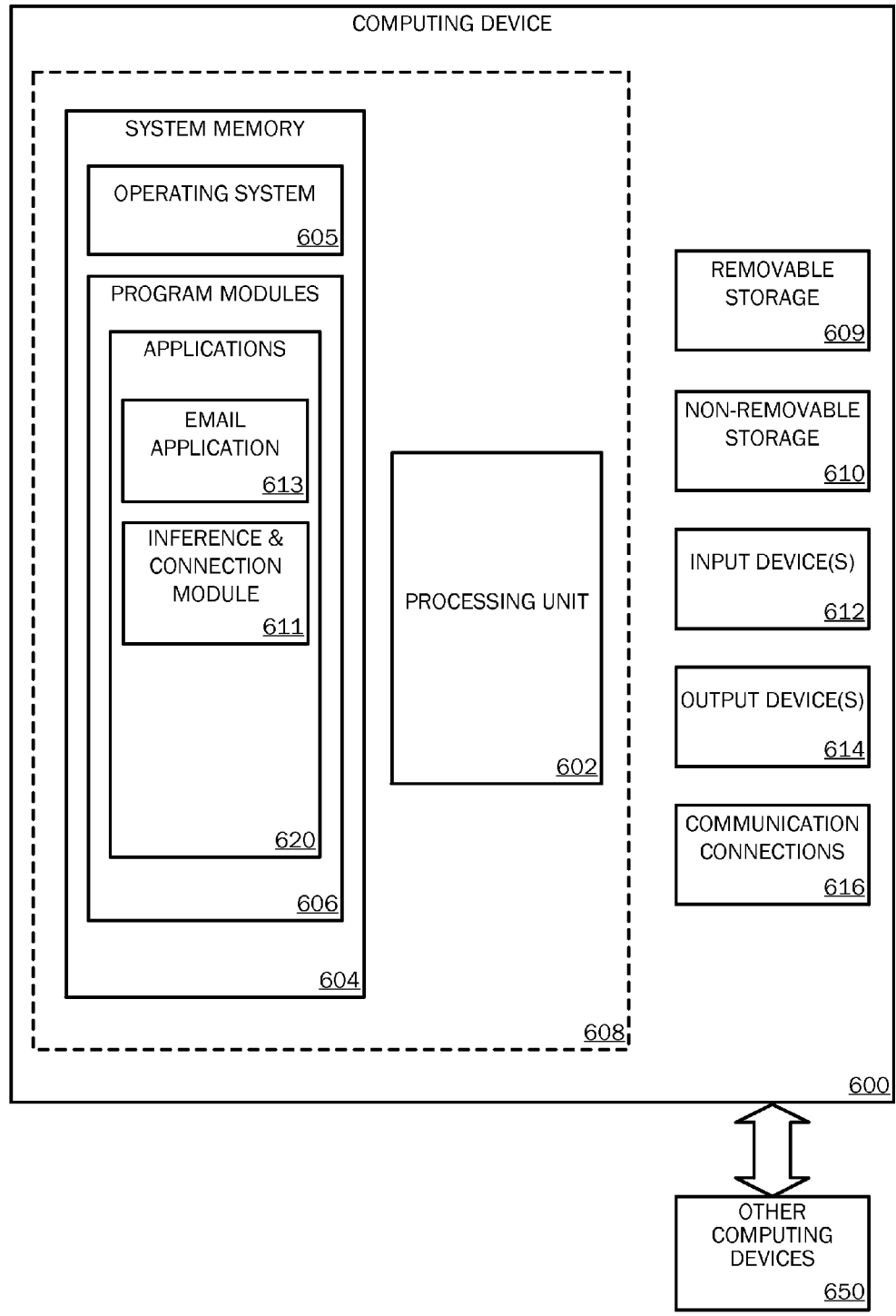
FIG. 6 is a block diagram illustrating example physical components of a computing device with which embodiments of the disclosure may be practiced.

FIGS. 6-9 and the associated descriptions provide a discussion of a variety of operating environments in which embodiments of the disclosure may be practiced. However, the devices and systems illustrated and discussed with respect to FIGS. 6-9 are for purposes of example and illustration and are not limiting of a vast number of computing device configurations that may be utilized for practicing embodiments of the disclosure, described herein FIG. 6 is a block diagram illustrating physical components (e.g., hardware) of a computing device 600 with which embodiments of the disclosure may be practiced. For example, the inference and connection system 118 shown as operating in the cloud 116 in FIG. 2 could be implemented by the computing device 600. The computing device components described below may include computer executable instructions for an inference and connection module 611 that can be executed to employ the method 500 and implement portions of the systems 100 and/or 200 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as the inference and connection module 611. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. For example, the user data 108, determined connections, relevant information, predefined greetings, default information collections, etc. could be stored on any of the illustrated storage devices.

As stated above, a number of program modules and data files may be stored in the system memory 604. While executing on the processing unit 602, the program modules 606 (e.g., inference and connection module 611 or email application 613) may perform processes including, but not limited to, a system for displaying a user information collection 100 and/or a system for creating a user information collection 200 as described herein. For example, the processing unit 602 may be operable to modify a user information collection stored in system memory 604 based on a newly determined relevant information connection, such as a new advertisement. In another example, the processing unit 602 is further operable to assemble an inference into a user information collection and associate the inference with one or pieces of relevant information, such as one or more advertisements. Other program modules that may be used in accordance with embodiments of the present disclosure, and in particular to generate screen content, may include electronic mail and contacts applications, word processing applications, spreadsheet applications, database applications, slide presentation applications, drawing, messaging applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 618, such as the user device 104. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
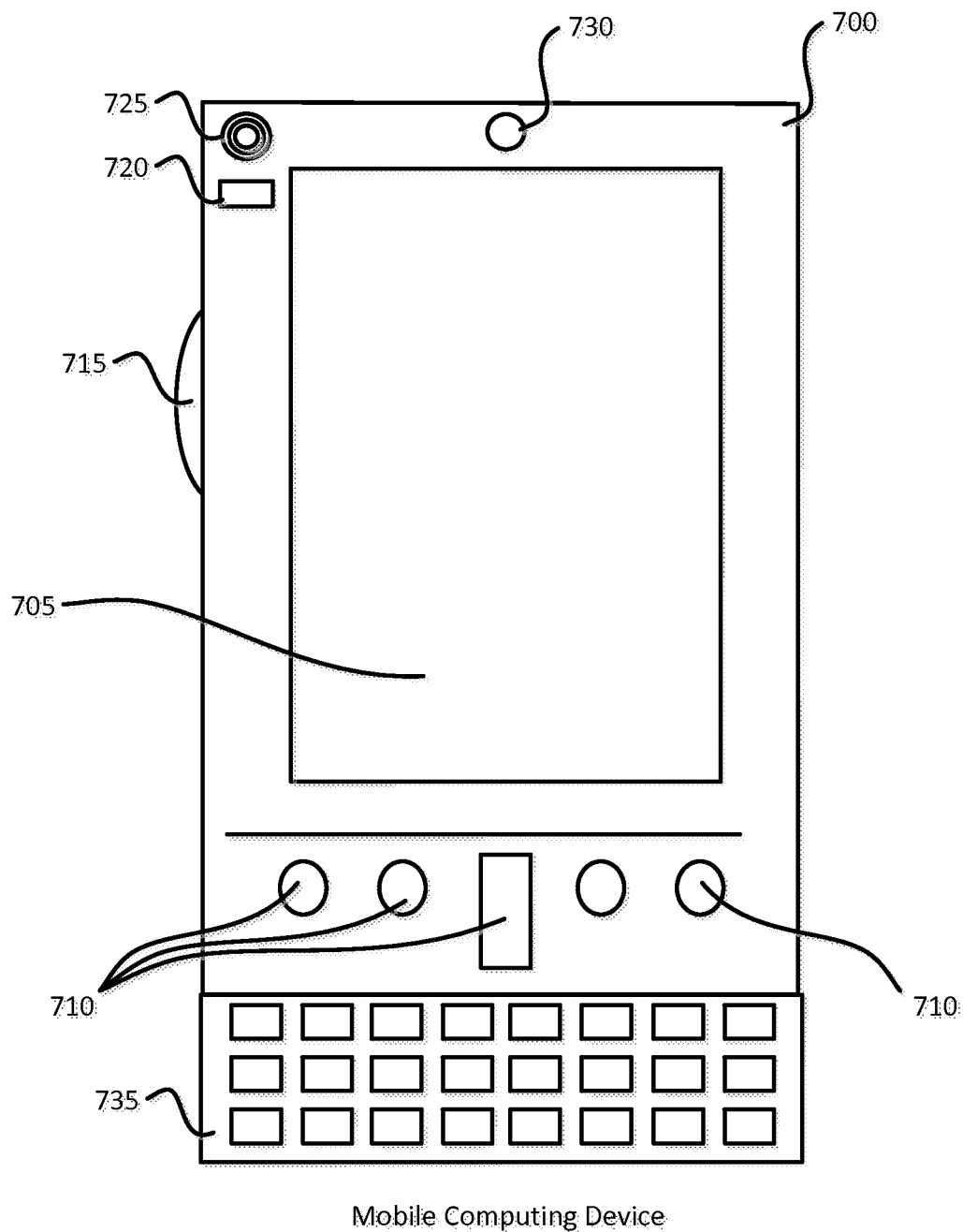
FIGS. 7A and 7B are simplified block diagrams of a mobile computing device with which embodiments of the present disclosure may be practiced.
Figure 7B:
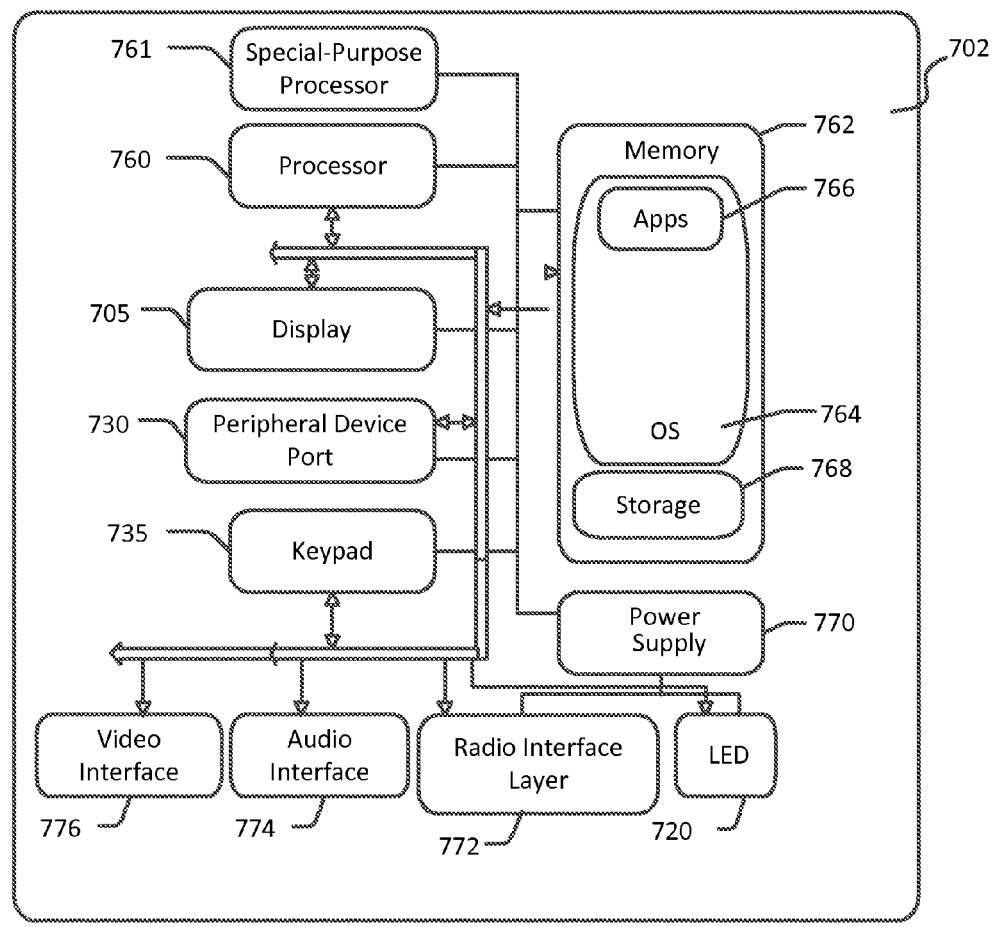

FIGS. 7A and 7B illustrate a mobile computing device 700, for example, a mobile telephone, a smart phone, wearable computer (such as a smart watch), a tablet personal computer, a laptop computer, and the like, with which embodiments of the disclosure may be practiced. For instance, the user device 104 could be implemented by the mobile computing device 700. With reference to FIG. 7A, one embodiment of a mobile computing device 700 suitable for implementing the embodiments is illustrated. In a basic configuration, the mobile computing device 700 is a hand-held computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In addition to, or in place of a touch screen input device associated with the display 705 and/or the keypad 735, a Natural User Interface (NUI) may be incorporated in the mobile computing device 700. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various embodiments, the output elements include the display 705 for showing a graphical user interface (GUI). In embodiments disclosed herein, the various user information collections could be displayed on the display 705. Further output elements may include a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (e.g., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions to make user inferences based on received user data and determine connection between the made user inferences and relevant information (e.g., weather information, traffic information, advertisements, and etc.) as described herein (e.g., inference and connection module 611).

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In some embodiments, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems. User data 108 may be provided from the user device 104 to the inference and connection system 118 in this manner.

Figure 8:
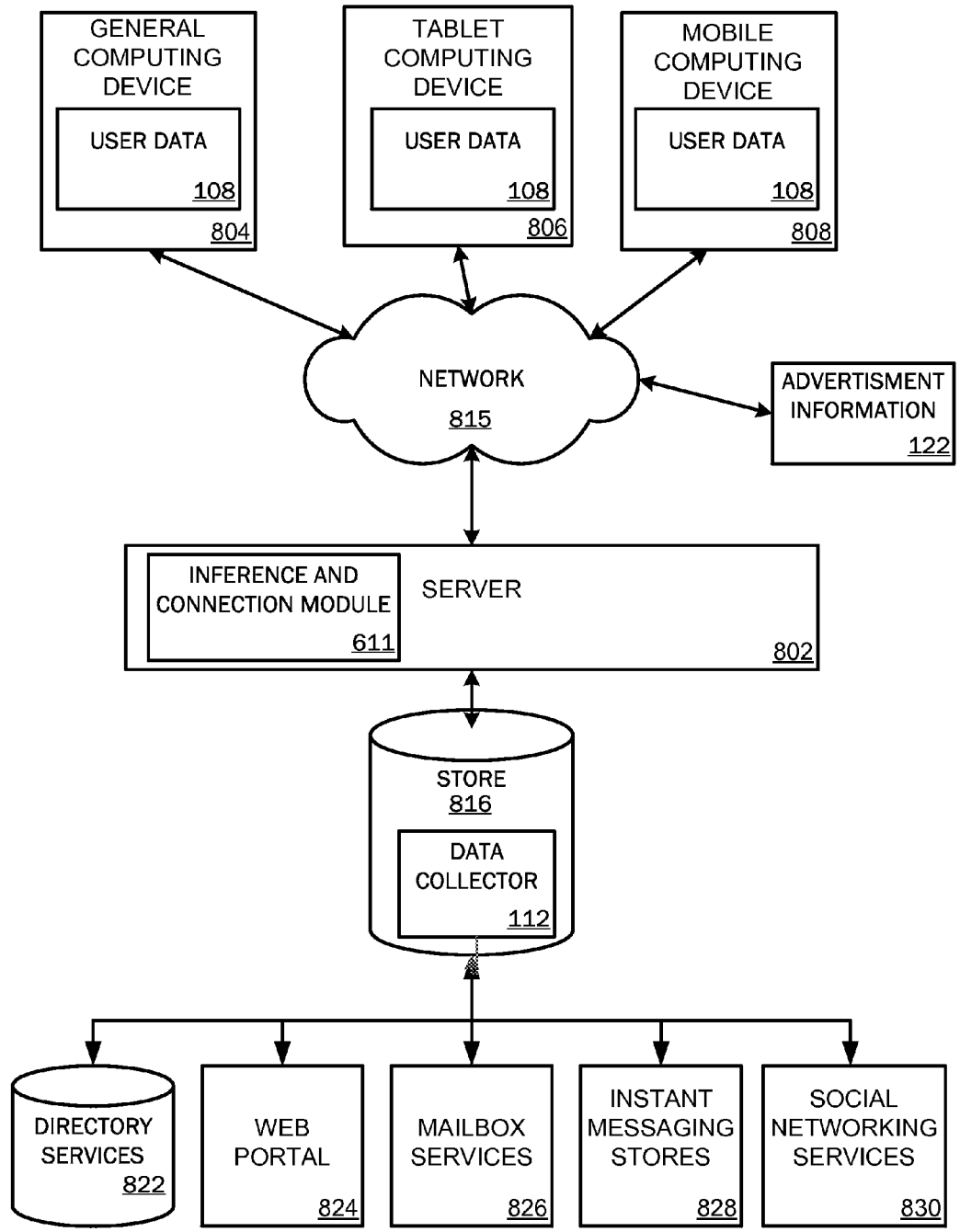
FIG. 8 is a simplified block diagram of a distributed computing system in which embodiments of the present disclosure may be practiced.

FIG. 8 illustrates one embodiment of the architecture of a system for processing data received at a computing system from a remote source, such as a general computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830. By way of example, the user device 104 may be embodied in a general computing device 804, a tablet computing device 806 and/or a mobile computing device 808 (e.g., a smart phone). User data 108 may be transmitted to the server device 802, which may be configured to implement the inference and connection module 611, via the network 815. In some implementations, user data 108 are periodically transmitted to the server device 802 and are stored in the data collector 112 of the store 816. Additionally advertisement information 122 may be transmitted to the server 802, which may be configured to implement the inference and connection module 611, via the network 815. In some implementations, advertisement information 122 is periodically transmitted to the server 802 and is stored in the data collector of the store 816.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A method for creating and providing user information collections, comprising:
   receiving initial user information;
   collecting a plurality of user signals associated with a user of at least one device;
   when at least one display criterion is met, displaying at a first time on the at least one device select pieces of user data that are relevant to the user in a user information collection based on the plurality of user signals and the initial user information;
   making a first inference based on the initial user information and the plurality of user signals, wherein the first inference is a new assumption about at least one of user likes, user dislikes, user characteristics, user schedule, user social status, user activity level, and future user actions;
   receiving a plurality of advertisements;

determining a first connection between a first advertisement from the plurality of advertisements and the first inference;
comparing the first connection to a confidence threshold;
when the confidence threshold is met, updating the user information collection to include the first inference and the first advertisement by listing and associating the first advertisement with the first inference in the user information collection to form an updated user information collection; and
when the at least one display criterion is met, displaying at a second time the updated user information collection that includes the first advertisement associated with the first inference on the at least one device to prevent display of the user information collection at inappropriate times for the user.

2. The method of claim 1, further comprising requesting user feedback about the first inference.

3. The method of claim 2, further comprising:
receiving the user feedback about the first inference;
making a second inference based on the user feedback, the initial user information, and the plurality of user signals;
determining a second connection between a second advertisement from the plurality of advertisements and the second inference;
comparing the second connection to the confidence threshold; and
updating the user information collection to include the second advertisement when the confidence threshold is met.

4. The method of claim 1, further comprising receiving user feedback about the first advertisement.

5. The method of claim 1, further comprising requesting user feedback about the first advertisement.

6. The method of claim 1, wherein the determining the first connection includes considering a time of day and a location of the at least one device.

7. The method of claim 1, further comprising monitoring the plurality of user signals after the displaying of the user information collection;
determining that the user utilized the first advertisement;
making a second inference based on the determining that the user utilized the first advertisement.

8. The method of claim 1, further comprising:
monitoring the plurality of user signals after the displaying of the user information collection;
determining that the user did not utilize the first advertisement; and
making a second inference based on the determining that the user did not utilize the first advertisement.

9. The method of claim 1, wherein the at least one display criterion comprises at least one of:
a received user request for an advertisement;
a determination of a predetermined user action;
a time of day:
a time period prior to a scheduled event; and
a location of the user.

10. The method of claim 1, wherein the first advertisement is a coupon.

11. The method of claim 1, further comprising:
requesting additional user information when the confidence threshold is not met;
receiving the additional user information;
making a second inference based on the additional user information, the initial user information, and the plurality of user signals;
determining a second connection between a second advertisement from the plurality of advertisements and the second inference;
comparing the second connection to the confidence threshold;
assembling the second advertisement into the user information collection when the confidence threshold is met.

12. The method of claim 1, wherein at a portion of the select pieces of user data in the user information collection are configured by the user.

13. A system comprising:
a computing device including a processing unit and a memory, the processing unit implementing an inference and connection system that is operable to:
receive initial user information;
receive a plurality of initial user signals associated with a user of at least one device;
when at least one display criterion is met, display at a first time on the at least one device select pieces of user data that are relevant to the user in a user information collection based on the plurality of user signals and the initial user information;
make inferences based on the initial user information and the plurality of initial user signals, wherein the inferences are assumptions about at least one of user likes, user dislikes, user characteristics, user schedule, user social status, user activity level, and future user actions;
determine a connection between the inferences and at least one advertisement;
compare the connection to a confidence threshold; and
assemble the inferences and the at least one advertisement into the user information collection to form an updated user information collection; and
when at least one display criterion is met, display at a second time the updated user information collection including the inferences and the at least one advertisement on the at least one device to prevent display of the user information collection at inappropriate times for the user.

14. The system of claim 13, further comprising:
a mobile device associated with the user;
wherein the processing unit is operable to transmit the user information collection to the mobile device.

15. The system of claim 13, wherein the inference and connection system is operable to make new inferences based on received additional user information and a plurality of received additional user signals and is operable to determine a new connection between the new inferences and at least one new advertisement.

16. The system of claim 15, wherein the memory stores the initial user information, the additional user information, the plurality of initial user signals and the plurality of received additional user signals, and the user information collection.

17. The system of claim 15, wherein the processing unit is operable to modify the user information collection stored in the memory based on the at least one new advertisement.

18. The system of claim 13, wherein the plurality of initial user signals include time of day signals and location signals.

19. The system of claim 13, wherein the processing unit is further operable to:

assemble an inference into the user information collection and associate the inference with the at least one advertisement.

20. A computer-readable storage device including computer-executable instructions stored thereon which, when executed by a computing system in a distributed network, cause the computing system to perform a method comprising:

receiving user information;

collecting a plurality of user signals associated with a user of at least one device;

making a first inference based on the user information and the plurality of user signals, wherein the first inference is an assumption about at least one of user likes, user dislikes, user characteristics, user schedule, user social status, user activity level, and future user actions;

requesting user feedback about the first inference;

receiving the user feedback about the first inference;

making a second inference based on the user information, the plurality of user signals, and the user feedback;

receiving a plurality of advertisements;

determining a connection between at least one advertisement from the plurality of advertisements and the second inference, wherein determining the connection includes considering a time of day and a location of the at least one device;

determining that the connection meets a confidence threshold; and displaying the at least one advertisement in association with the second inference based on the determining that the connection meets the confidence threshold.

* * * * *